United States Patent
Takahashi et al.

(10) Patent No.: US 6,502,863 B1
(45) Date of Patent: Jan. 7, 2003

(54) FENDER STRUCTURE

(75) Inventors: Shinji Takahashi, Saitama (JP); Masao Takeshima, Saitama (JP); Shinichi Karube, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 39 days.

(21) Appl. No.: 09/654,259

(22) Filed: Sep. 1, 2000

(30) Foreign Application Priority Data

Sep. 3, 1999  (JP) .......................................... 11-250975

(51) Int. Cl.⁷ ................................................. B62B 9/99
(52) U.S. Cl. ........................ 280/847; 280/291; 280/163
(58) Field of Search ................................. 280/847, 848, 280/851, 852, 160, 160.1, 163, 164.1, 152.1, 152.2, 152.3, 291

(56) References Cited

U.S. PATENT DOCUMENTS

| | | | | |
|---|---|---|---|---|
| 4,451,057 A | * | 5/1984 | Lawson ....................... | 280/291 |
| 5,062,675 A | * | 11/1991 | Rhoden et al. .............. | 296/1.1 |
| 5,107,952 A | * | 4/1992 | Matsubayashi et al. ..... | 180/349 |
| D389,440 S | * | 1/1998 | Walters et al. ............. | D12/120 |
| 5,722,690 A | * | 3/1998 | Ward et al. ................. | 280/851 |
| 5,794,976 A | * | 8/1998 | Stevicks ..................... | 280/770 |
| 5,893,424 A | * | 4/1999 | Hisada ....................... | 180/90.6 |
| 6,016,943 A | * | 1/2000 | Johnson et al. ............. | 224/401 |
| 6,113,121 A | * | 9/2000 | Mizuta ....................... | 280/163 |
| 6,116,630 A | * | 9/2000 | Thomas ...................... | 280/291 |
| 6,270,106 B1 | * | 8/2001 | Mak et al. .................. | 280/291 |

FOREIGN PATENT DOCUMENTS

JP          A1111371      *  1/1999

\* cited by examiner

Primary Examiner—Robert P. Olszewski
Assistant Examiner—James S. McClellan
(74) Attorney, Agent, or Firm—Birch, Stewart, Kolasch & Birch, LLP (57) ABSTRACT

To provide a sub fender through which it is difficult for mud or snow to invade. A sub fender for connecting respective lower end portions of a front fender and a rear fender is constituted by a front wall portion attached to the front fender, a rear wall portion attached to the rear fender and a bottom wall portion for connecting lower end portions thereof substantially horizontally. The front wall portion is formed separately from the bottom wall portion and a lower end portion thereof constitutes a downward extended portion extended in a downward direction by a dimension L relative to the bottom wall portion. A slit is provided on the extended portion. Furthermore, an engaging protrusion integrally protruded from a front end of the bottom wall portion in a front direction is provided. The engaging protrusion is engaged with an engaging hole provided at the downward extended portion to thereby position the parts in assembling operation.

24 Claims, 7 Drawing Sheets

FENDER STRUCTURE

BACKGROUND OF THE INVENTION

1. Field of the Invention

The present invention relates to a fender attaching structure in a rough ground running saddle riding type vehicle such as a four wheel buggy.

2. Description of Related Art

Japanese Patent Laid-Open No. 11371/1999 discloses a rough ground running saddle riding type vehicle having a front fender covering from an upper portion to a rear portion of a front wheel, a rear fender covering from a front portion to an upper portion of a rear wheel and a sub fender connecting the front fender and the rear fender.

Figure 7:
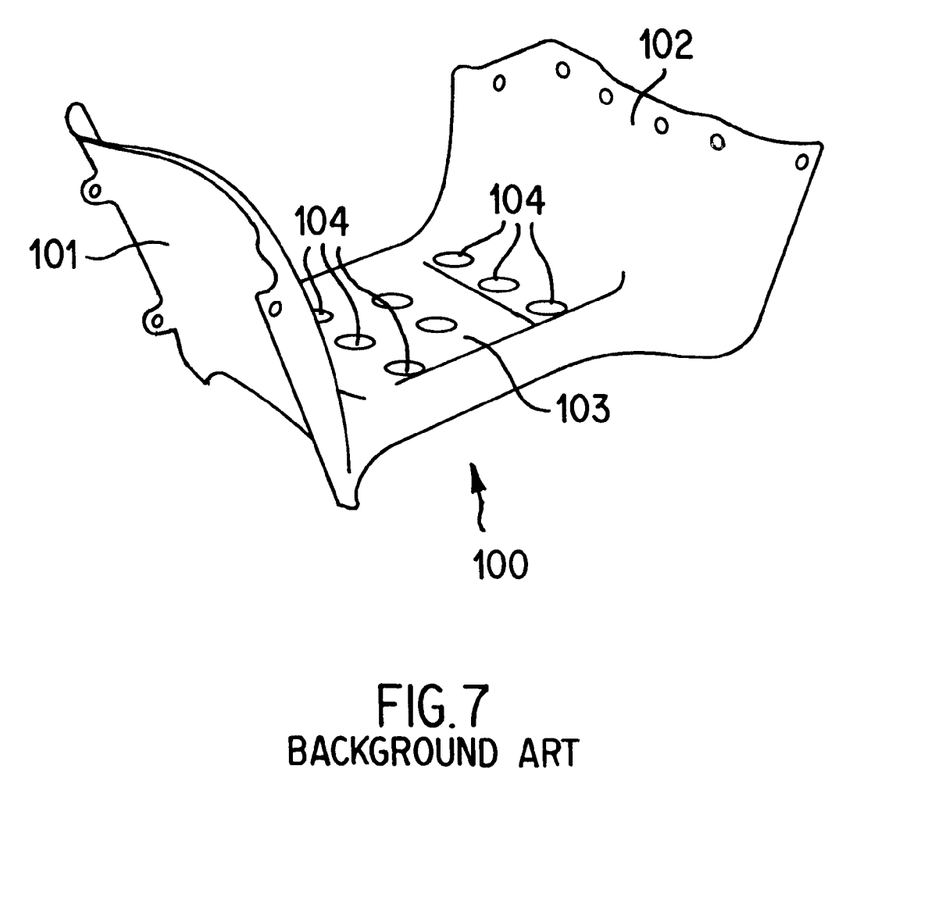
FIG. 7 is a side view of a sub fender according to the related art.

FIG. 7 of the present invention illustrates an example of a sub fender. The sub fender 100 is integrally formed with a front wall portion 101 having an upper end attached to a lower end portion of a front fender and extending in a downward direction, a rear wall portion 102 having an upper end similarly attached to a lower end portion of a rear fender and extending in the downward direction, and a bottom wall portion 103 for connecting the lower end portions at a front and a rear portion thereof. Furthermore, the bottom wall portion 103 is provided with a plurality of holes 104 for dropping mud, snow or the like.

When a vehicle provided with the above-described sub fender 100 is driven, mud, snow or the like accumulates on a front side of the front wall portion 101, rides over a lower end of the front wall portion 101 and reaches an inner side of the bottom wall portion 103. The mud, snow or the like may pass through the holes 104, invade above the bottom wall portion 103 or invade from an inner side of a vehicle body onto the bottom wall portion 103.

SUMMARY OF THE INVENTION

It is an object of the present invention to avoid the disadvantages of the related art devices. In particular, it is an object of the present invention to prevent invasion of mud or snow as much as possible from above the bottom wall portion of a sub fender.

In order to resolve the above-described problem, according to a first aspect of the present invention, there is provided a fender structure characterized in that in a rough ground running saddle riding type vehicle having a front fender covering from an upper portion to a rear portion of a front wheel, a rear fender covering from a front portion to an upper portion of a rear wheel and a sub fender for connecting the front fender and the rear fender, the sub fender comprising a front wall portion an upper end portion of which is connected to a lower end portion of the front fender and which is extended in a downward direction, a rear wall portion an upper end portion of which is connected to a lower end portion of the rear fender and which is extended in the downward direction and a bottom wall portion connecting respective lower portions of the front wall portion and the rear wall portion wherein the lower end portion of the front wall portion constitutes a downward extended portion extended in the downward direction longer than the bottom wall portion.

According to a second aspect of the present invention, there is provided the fender structure according to the first aspect, characterized in that the downward extended portion is provided with a slit reaching a lower end thereof in up and down directions.

According to a third aspect of the present invention, there is provided the fender attaching structure according to the first aspect, characterized in that at least the front wall portion of the front wall portion and the rear wall portion is formed separately from the bottom wall portion and the separate portion and the bottom wall portion are connected by engagement.

According to the first aspect of the present invention, the downward extended portion is provided at the lower portion of the front wall portion. Therefore, by extending the downward extended portion in the downward direction more than the bottom wall portion, even when mud or snow stored on the front side of the front wall portion rides over the lower end of the downward extended portion, it is difficult for the mud or snow to reach the bottom wall portion. Therefore, the mud or snow can be prevented from invading above the bottom wall portion as much as possible.

According to the second aspect of the present invention, the downward extended portion is provided with the slit. Accordingly, although the lower end portion of the downward extended portion is extended in the downward direction more than the bottom wall portion, even when the downward extended portion is brought into contact with a projected object on a lane such as a log or the like, the lower extended portion is easily deformed and can pass therethrough. Accordingly, durability of the front wall portion and accordingly the sub fender as a whole can be promoted.

According to the third aspect of the present invention, by constituting the front wall portion or the rear wall portion separately from the bottom wall portion, the respective portions are formed by being divided into a plurality of small-sized portions. Thereafter, these are assembled and accordingly, formation of the sub fender can be facilitated. Particularly, the formation of the portion having the downward extended portion can be facilitated and further, interchange in destruction thereof can be carried out easily and to a necessary minimum. Accordingly, the interchange becomes economical. Furthermore, the bottom wall portion and the portions separate therefrom are engaged and assembled. Accordingly, positioning in assembling and integrating the plurality of portions can be ensured and the assembling operation can be facilitated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 2:
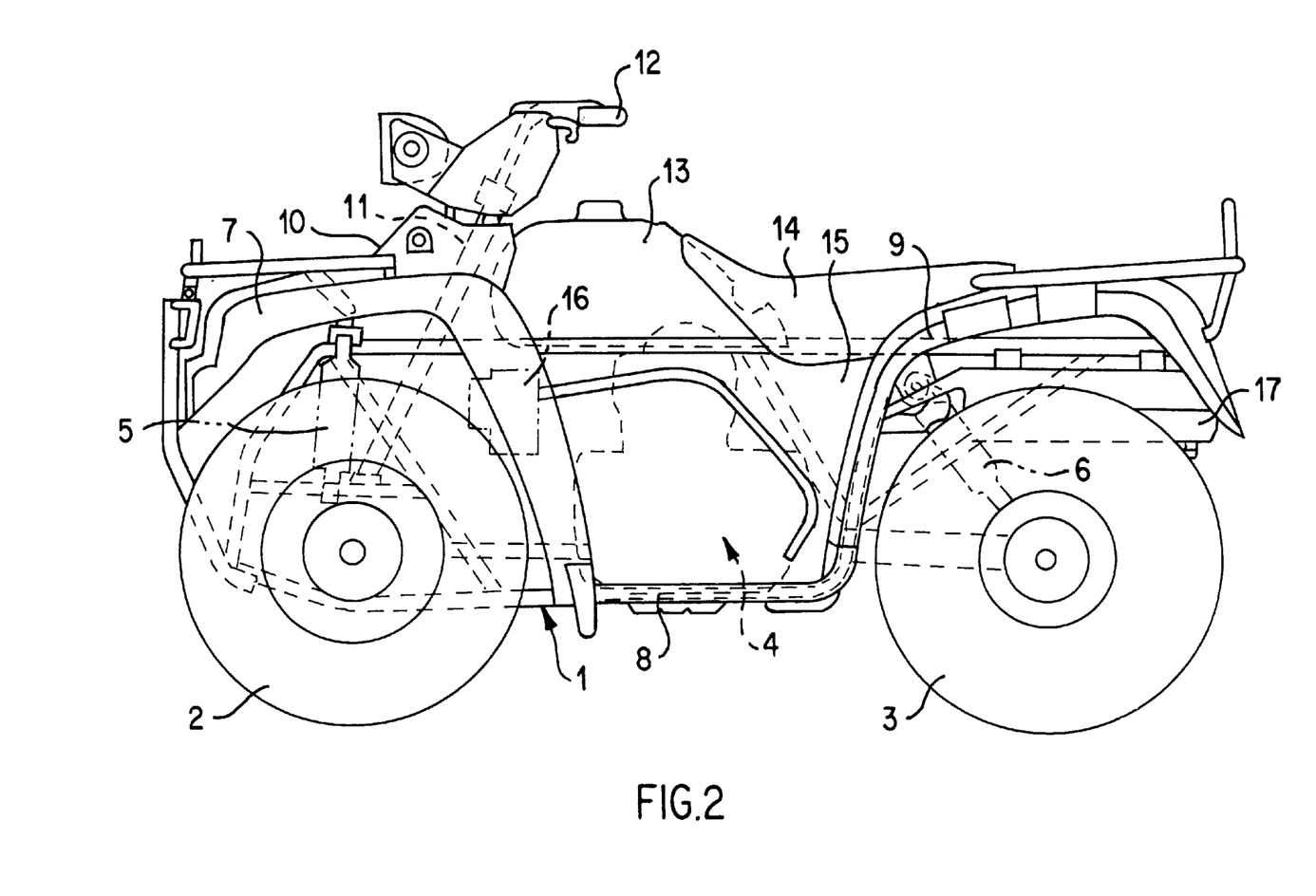
FIG. 2 is a side view of a four wheel buggy to which the embodiment of the present invention is applied.
Figure 3:
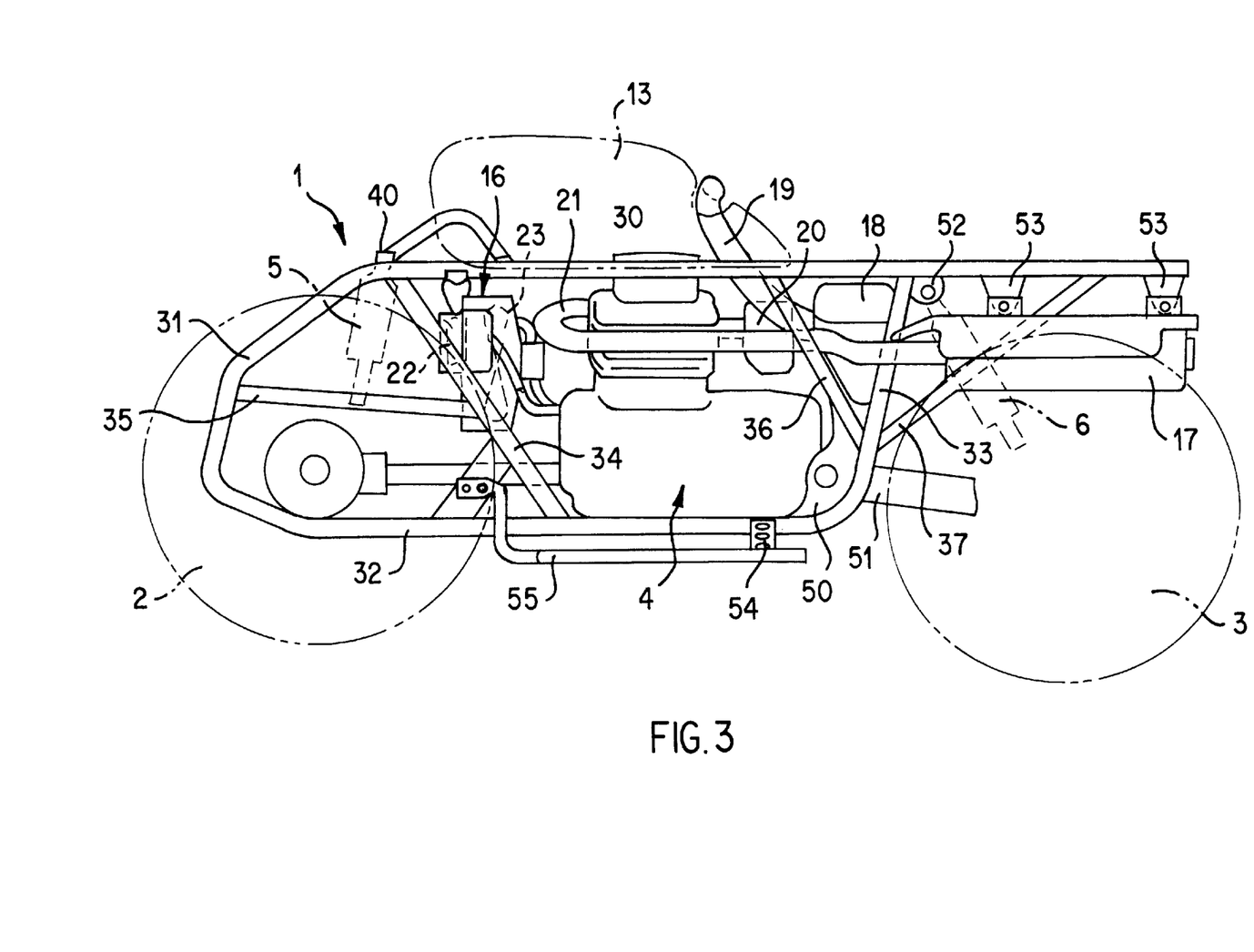
FIG. 3 is a side view of essential portions of a vehicle body.
Figure 4:
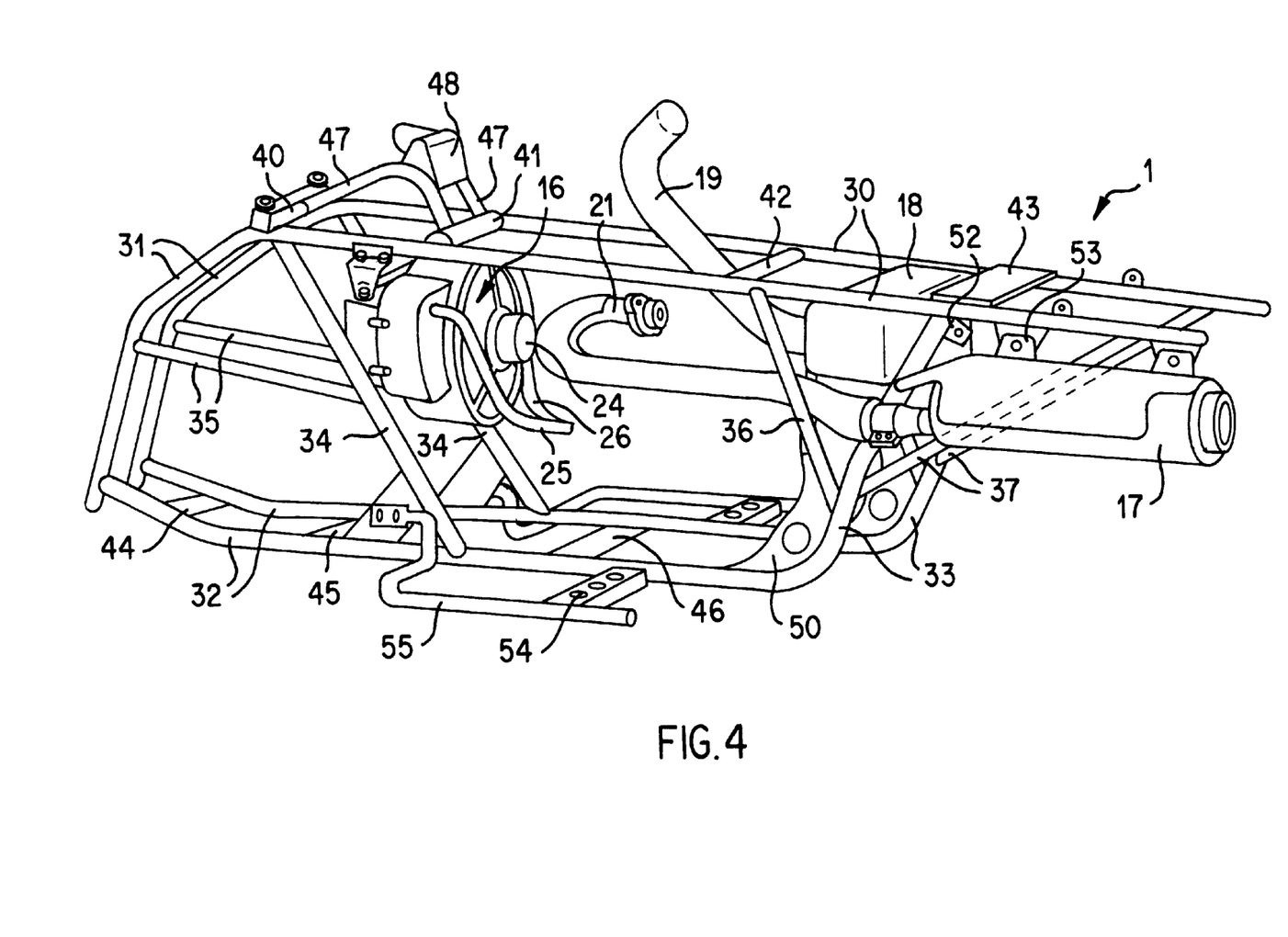
FIG. 4 is a perspective view of similar portions.

An explanation will now be provided for an embodiment of the present invention as applied to a four wheel buggy with reference to the drawings as follows. First, an explanation will be provided for an outline of a general vehicle body. FIG. 2 is a side view of a finished state of the buggy, FIG. 3 is a side view of a vehicle body showing a skeleton of the vehicle body and a state partially attached with parts of accessories or the like and FIG. 4 is a perspective view thereof.

According to the buggy, pairs of front wheels 2 and rear wheels 3 comprising low pressure balloon tires are supported respectively on a left and a right side of a front and a rear portion of a vehicle body frame 1. The front wheels 2 and the rear wheels 3 are driven by a power unit 4 mounted at a central portion of the vehicle body frame 1 and are suspended by a front cushion or shock absorber 5 and a rear cushion or shock absorber 6, respectively.

Notation 7 in FIG. 2 designates a front fender, 8 designates a sub fender, and 9 designates a rear fender. Furthermore, 10 designates a front panel, 11 designates a steering shaft, 12 designates a handlebar, 13 designates a fuel tank, 14 designates a saddle riding type seat, 15 designates a rear panel, 16 designates a cooling unit and 17 designates a muffler. Furthermore, 18 in FIG. 3 designates an air cleaner, 19 designates a snorkel duct and 20 designates a carburetor.

An explanation will now be provided for the structure of the vehicle body frame 1. As shown by FIG. 3 and FIG. 4, the vehicle frame 1 is provided with respective left and right pairs of upper pipes 30 extending in a front and rear direction substantially in parallel with each other and in a linear shape. Front pipes 31 extend in up and down directions from front end portions of the upper pipes 30. Lower pipes 32 extend in a rear direction from lower end portions of the front pipes 31. Furthermore, center pipes 33 extend in an upper direction from rear end portions of the lower pipes 32 and connect to positions shifted rearward from middle portions of the upper pipe 30.

In addition, the vehicle body frame 1 is provided with respective left and right pairs of reinforcement pipes 34 connected from front end portions of the upper pipes 30 to front half side portions of the lower pipes 32 in an oblique direction. Middle pipes 35 connect middle portions of the reinforcement pipes 34 and the front pipes 31 in the front and rear direction. Reinforcement pipes 36 and 37 connect middle portions of the center pipes 33 and front and rear positions of the upper pipes 30, sandwiching the points of connection of the center pipes 33 with the upper pipes 30 therebetween. Furthermore, a cross member 40, cross pipes 41 and 42 and cross members 43, 44, 45, 46 and the like are respectively made to span the left and right members to thereby constitute the vehicle body frame 1 such that the vehicle body frame 1 is connected and integrated.

The cross member 40 is provided between front end portions of the upper pipes 30 and is connected with the cross pipe 41 which is arranged on a rear side thereof and in parallel therewith by head portion pipes 47 formed in a shape of a mountain in side view in the front and rear direction. An upper portion of the steering shaft 11 is rotatably supported by a stay 48 provided at top portions of the head portion pipes 47. A lower end portion of the steering shaft 11 is axially supported at a bearing portion provided at the middle pipes 35.

Furthermore, an upper end portion of the front cushion 5 is supported by both left and right ends of the cross member 40 and a lower end portion of the front cushion 5 is attached to upper arms constituting a front wheel suspension of a double wishbone type (not illustrated). The upper arms are pivotably supported by the middle pipes 35 and lower arms paired therewith are pivotably supported by front end portions of the lower pipes 32.

Pivot plates 50 are provided at corner portions of lower portions of the center pipes 33 and rear ends of the lower pipes 32. Front end portions of rear swing arms 51 are pivotably supported by the pivot plates 50. The rear swing arm 51 contains a drive shaft constituting a rear wheel drive mechanism.

The upper pipes 30 are extended further rearward from portions thereof connecting with the center pipes 33. An upper end portion of the rear cushion 6 is supported by stays 52 provided at this portion and the muffler 17 is supported by other stay 53.

An exhaust pipe 21 has a rear end portion thereof connected to the muffler 17. The exhaust pipe 21 is extended in the front direction substantially in a linear shape and a front end portion thereof is bent substantially in a U-like shape and is connected to an exhaust port provided at a cylinder head of the power unit 4. The cooling unit 16 is hung from and supported by the upper pipes 30 on a front side of the power unit 4 and the cooling unit 16 is integrated with an oil cooler 22. Furthermore, reference numeral 23 identifies a cooling fan, 24 identifies a motor thereof, and notations 25 and 26 identify hoses connected to the power unit 4.

In addition, steps 54 extending outwardly are provided at portions of the left and right lower pipes 32 for mounting the power unit 4. The steps 54 protrude from the lower pipes 32 in outer side directions. Step frames 55 are bent to connect front ends of the steps 54 and the lower pipes 32. Furthermore, the sub fender 8 is mounted on and attached to these members (the sub fender 8 on the right side of the vehicle body is not illustrated).

Figure 1:
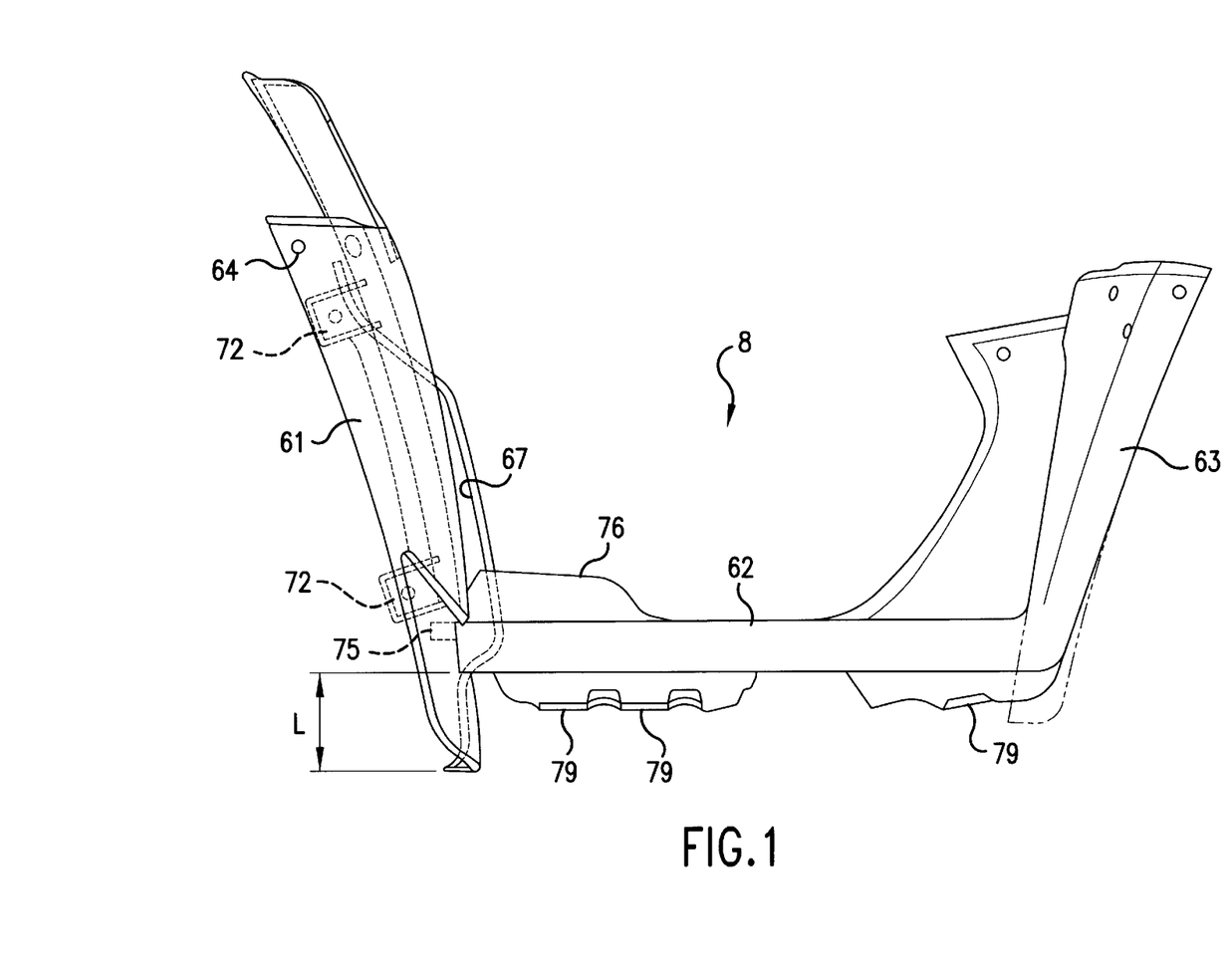
FIG. 1 is a side view of a sub fender according to an embodiment of the present invention.
Figure 5:
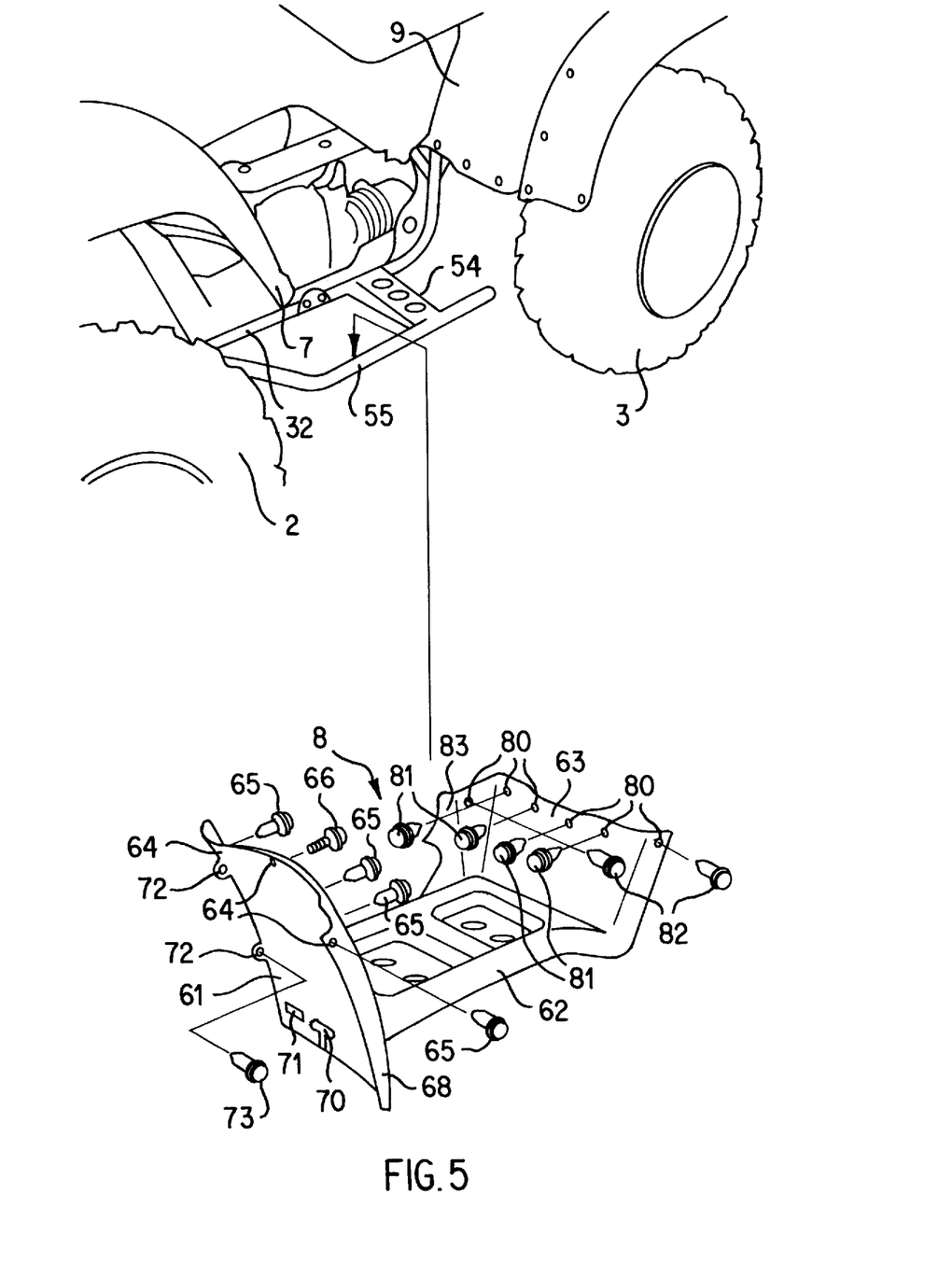
FIG. 5 is a drawing showing attachment of the sub fender according to the embodiment of the present invention.
Figure 6:
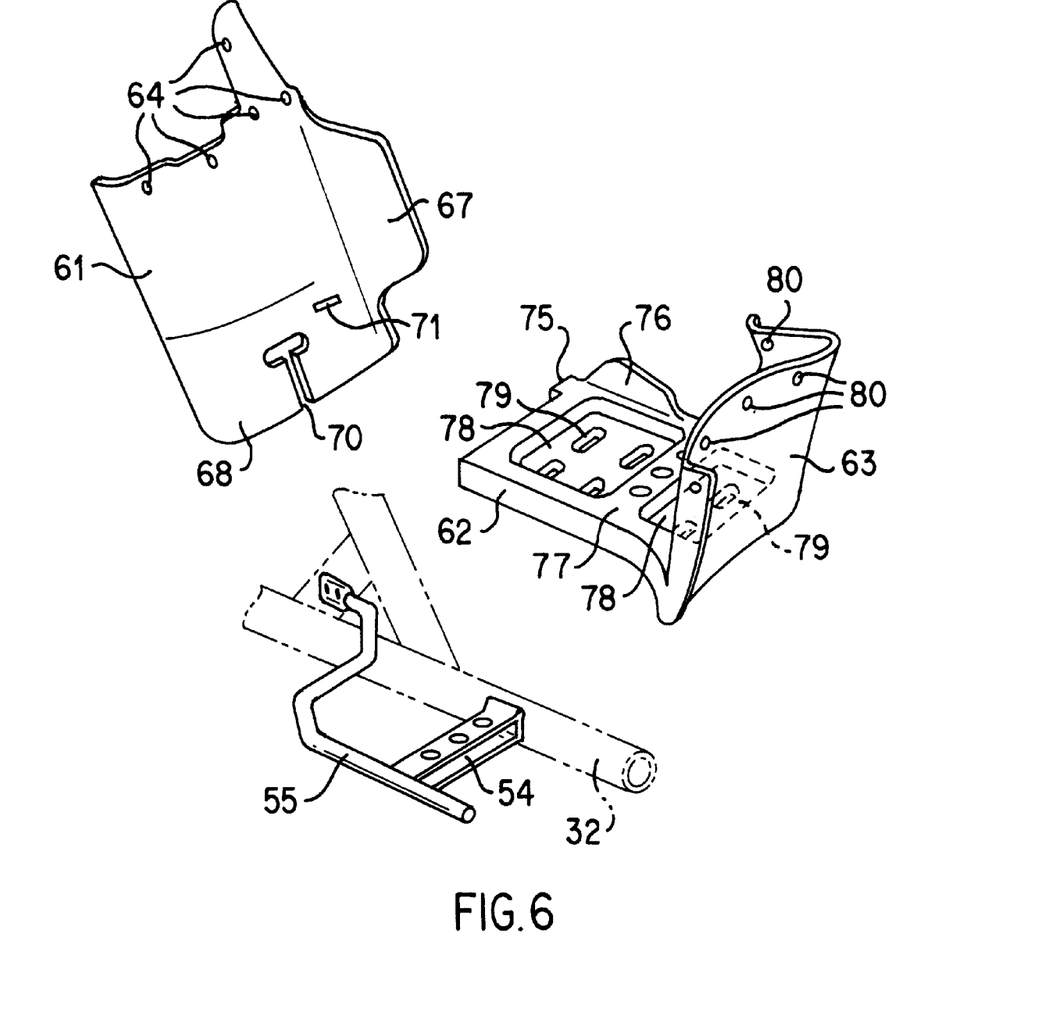
FIG. 6 is a disassembled view of the sub fender.

An explanation will now be provided for structure of a sub fender. FIG. 1 is a side view of a sub fender, FIG. 5 is a drawing illustrating attachment thereof to a vehicle body, and FIG. 6 is a disassembled view of the sub fender. As shown by FIG. 5, a sub fender 8 is a member for connecting lower end portions of a front fender 7 and a rear fender 9. The sub fender 8 includes a front wall portion 61, a bottom wall portion 62 and a rear wall portion 63. Each of the wall portions 61, 62, 63 is formed by using pertinent synthetic resin or the like. The front wall portion 61 and the bottom wall portion 62 are separate members and the bottom wall portion 62 and the rear wall portion 63 are integrated.

As shown by FIG. 5, the front wall portion 61 is attached to the lower end portion of the front fender 7 at attaching holes 64 provided at an upper end portion thereof by clips 65 and a screw 66. Furthermore, as is apparent from FIG. 1, an inner side portion of the front wall portion 61 constitutes an extended portion 67 extended in a rear direction, and a lower end portion thereof constitutes a downward extended portion 68 extended in a downward direction by a length L more than the bottom wall portion 62.

A central portion of the downward extended portion 68 in a vehicle width direction is formed with a slit 70 reaching a lower end thereof in up and down directions. Furthermore, an engaging hole 71 is formed in the vicinity of an upper end portion of the slit 70. Reference numeral 72 identifies an attaching portion for attaching the sub fender 8 to a side of the vehicle body by using a clip 73.

As is apparent from FIG. 1 and FIG. 6, the bottom wall portion 62 is a portion arranged substantially horizontally in the front and rear direction when the portion is attached to the vehicle body to constitute a step floor. A front end portion of the bottom wall portion 62 is integrally formed with an engaging protrusion 75 projected in the front direction to engage with the engaging hole 71 formed in the front wall portion 61. Furthermore, an extended portion 76 extended in an upper direction is formed on an inner side of a front portion thereof and when the bottom wall portion 62 is integrated with the front wall portion 61, the extended portion 76 and a lower portion of the extended portion 67 partially overlap to thereby form an inner side wall covering the inner side of the vehicle body in a corner portion of the front wall portion 61 and the front end portion of the bottom wall portion 62.

Furthermore, a step attaching portion 77 is provided extending in the vehicle width direction at a central portion of the bottom wall portion 62 in the front and rear direction. Portions forward and rearward from the step attaching portion 77 constitute recess portions 78. A plurality of through holes 79 are formed at bottom portions of the bottom wall portion 62 (FIG. 6). The step attaching portion 77 overlaps the step 54 and is coupled thereto by screws or the like. Furthermore, the lower face of the front wall portion 61 is supported also by the step frames 55 for connecting the front ends of the steps 54 and the vehicle body frames.

The rear end of the bottom wall portion 62 is continuously and integrally connected to the lower end of the rear wall portion 63. That is, the bottom wall portion 62 and the rear wall portion 63 are formed as an integrated part substantially in an L-like shape (FIG. 6). As shown by FIG. 5, the upper end of the rear wall portion 63 is coupled to the lower end portion of the rear fender 9 at attaching holes 80 by clips 81. An extended portion 83 is integrally formed from an inner side portion of the rear wall portion 63 in the front direction to thereby constitute an inner side wall for covering the inner side of the vehicle body in a corner portion of the rear portion of the bottom wall portion 62 and the rear wall portion 63.

An explanation will now be provided for the operation of the embodiment of the present invention. First, the front wall portion 61 is attached to the lower end portion of the front fender 7, the bottom wall portion 62 is mounted on and attached to the steps 54 and the step frames 55, and the rear wall portion 63 is attached to the lower end portion of the rear fender 9. At this point, when the engaging protrusion 75 is engaged with the engaging hole 71, the front wall portion 61 and the bottom wall portion 62 are positioned to integrate to thereby constitute the sub fender 8. Therefore, in assembling and integrating the respective portions which are divided in a plurality pieces, the positioning is ensured and the operation is facilitated.

In the attaching operation, since the slit 70 is formed at the downward extended portion 68, even when the front end portion 61 and the step frames 55 interfere with each other due to an error in the accuracy of forming the parts and accuracy of integrating the vehicle body, the downward extended portion 68 is deformable at the slit 70. Accordingly, the attachment can be carried out easily.

Furthermore, by engaging the engaging protrusion 75 with the engaging hole 71, even when the front wall portion 61 and the bottom wall portion 62 are constituted by separate members, the positioning can be carried out accurately. Therefore, the assembling is facilitated. Furthermore, by constituting the front wall portion 61 separately from the side of the bottom wall portion 62, fabrication of the sub fender 8 is facilitated.

Furthermore, by constituting the front wall portion 61 separately from the bottom wall portion 62, there is constructed a structure which is divided into a plurality of small-sized portions and therefore, these small-sized portions can be easily formed. Particularly, formation of the front wall portion 61 having the downward extended portion 68 can be facilitated and interchange thereof in destruction can be carried out easily and to a necessary minimum, which is economical.

Furthermore, when the vehicle runs on rough ground when the sub fender 8 is attached, mud or snow is stored on the front side of the sub fender 8, rides over the lower end of the downward extended portion 68 and is moved around to the lower side of the bottom wall portion 62.

However, the downward extended portion 68 is extended in the downward direction by the dimension L relative to the bottom portion of the front wall portion 61. Accordingly, it is difficult for mud or snow to reach the bottom portion of the bottom wall portion 62. Furthermore, the mud or snow is less likely to invade from the through holes 79 to above the bottom wall portion 62.

Furthermore, mud or snow which moves around to the inner side of the vehicle body is prevented from invading similarly by the extended portion 67 and the extended portion 76. Therefore, in comparison with the conventional constitution, invasion of mud or snow to the bottom wall portion 62 can significantly be reduced and mud or snow is difficult to invade into the bottom wall portion 62 constituting the step floor. Accordingly, the present invention is preferable when the vehicle is being operated on rough ground.

Furthermore, even when a protruding object such as a log or the like is present, when the downward extended portion 68 is brought into contact therewith, the downward extended portion 68 passes therethrough by being deformed easily to the rear direction by the presence of the slit 70. Therefore, regardless of the presence of the downward extended portion 68, the vehicle can easily runs on rough ground which has a number of protruding objects. Accordingly, the vehicle can easily run on rough ground having a number of protruding objects. Furthermore, durability of the front wall portion 61 and accordingly, the sub fender as a whole is promoted.

Furthermore, the present invention is not limited to the above-described embodiments but can be modified and applied variously. For example, the fabrication can further be facilitated by constituting the rear wall portion 63 separately from the bottom wall portion 62. Furthermore, as shown by imaginary lines in FIG. 1, the lower end portion of the rear wall portion 63 may be provided with a downward extended portion and a slit 70 may be formed at that portion. Furthermore, the vehicle to which the present invention is applied is not limited to a four wheel buggy, but various vehicles with similar use constitute the object of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sub fender for a rough ground running saddle riding type vehicle, said vehicle having a fender structure including a front fender for covering from an upper portion to a rear portion of a front wheel of the vehicle; and a rear fender for covering from a front portion to an upper portion of a rear wheel of the vehicle, said sub fender for connecting the front fender and thee rear fender and comprising:
   a front wall portion having an upper end portion for connecting to a lower end portion of the front fender and extending in a downward direction;
   a rear wall portion having an upper end portion for connecting to a lower end portion of the rear fender and extending in the downward direction;
   a bottom wall portion connecting respective lower portions of said front wall portion and said rear wall portion; and
   wherein said lower portion of said front wall portion includes a downward extending portion integrally formed in a single piece and extended in the downward direction below said bottom wall portion.

2. The sub fender according to claim 1, wherein said downward extending portion is provided with a slit extending from a lower end thereof in up and down directions.

3. The sub fender according to claim 1, wherein at least one of said front wall portion and said rear wall portion is formed separately from said bottom wall portion and the separate portion and said bottom wall portion are connected by an engagement.

4. The sub fender according to claim 3, wherein said engagement is a hole formed in said separate portion and a protrusion formed on said bottom wall portion, said protrusion for engaging within said hole.

5. The sub fender according to claim 1, wherein said front wall portion includes an extended portion extending in a rear direction from an inner side thereof and said bottom wall portion includes an extended portion extending in an upper direction from an inner side thereof, and wherein said extended portion of said front wall portion and said extended portion of said bottom wall portion partially overlap to form a front inner side wall.

6. The sub fender according to claim 5, wherein said rear wall portion includes an extended portion extending in a front direction from an inner side thereof, said extended portion forming a rear inner side wall.

7. The sub fender according to claim 1, wherein said lower portion of said rear wall portion includes an integral, downward extending portion extended in the downward direction below said bottom wall portion.

8. The sub fender according to claim 1, wherein said front wall portion is formed from synthetic resin in a single piece with said downward extending portion.

9. A fender structure for a rough ground running saddle riding type vehicle, said fender structure comprising:
   a front fender for covering from an upper portion to a rear portion of a front wheel of the vehicle;
   a rear fender for covering from a front portion to an upper portion of a rear wheel of the vehicle; and
   a sub fender for connecting said front fender and said rear fender, said sub fender including:
      a front wall portion having an upper end portion connected to a lower end portion of said front fender and extending in a downward direction;
      a rear wall portion having an upper end portion connected to a lower end portion of said rear fender and extending in the downward direction;
      a bottom wall portion connecting respective lower portions of said front wall portion and said rear wall portion; and
      wherein said lower portion of said front wall portion includes a downward extending portion integrally formed in a single piece and extended in the downward direction below said bottom wall portion.

10. The fender structure according to claim 9, wherein said downward extending portion is provided with a slit extending from a lower end thereof in up and down directions.

11. The fender structure according to claim 9, wherein at least one of said front wall portion and said rear wall portion is formed separately from said bottom wall portion and the separate portion and said bottom wall portion are connected by an engagement.

12. The fender structure according to claim 11, wherein said engagement is a hole formed in said separate portion and a protrusion formed on said bottom wall portion, said protrusion for engaging within said hole.

13. The fender structure according to claim 9, wherein said front wall portion includes an extended portion extending in a rear direction from an inner side thereof and said bottom wall portion includes an extended portion extending in an upper direction from an inner side thereof, and wherein said extended portion of said front wall portion and said extended portion of said bottom wall portion partially overlap to form a front inner side wall.

14. The fender structure according to claim 13, wherein said rear wall portion includes an extended portion extending in a front direction from an inner side thereof, said extended portion forming a rear inner side wall.

15. The sub fender according to claim 9, wherein said lower portion of said rear wall portion includes an integral, downward extending portion extended in the downward direction below said bottom wall portion.

16. The fender structure according to claim 9, wherein said front wall portion is formed from synthetic resin in a single piece with said downward extending portion.

17. A rough ground running saddle riding type vehicle, comprising:
   a vehicle body frame;
   a pair of front wheels and a pair of rear wheels mounted for rotation on said vehicle body frame;
   a power unit mounted at a central portion of said vehicle body frame;
   a pair of front fenders covering from an upper portion to a rear portion of said pair of front wheels, respectively;
   a pair of rear fenders covering from a front portion to an upper portion of said pair of rear wheels, respectively; and
   a sub fender for connecting said front fender and said rear fender, said sub fender including:
      a front wall portion having an upper end portion connected to a lower end portion of said front fender and extending in a downward direction;
      a rear wall portion having an upper end portion connected to a lower end portion of said rear fender and extending in the downward direction;
      a bottom wall portion connecting respective lower portions of said front wall portion and said rear wall portion; and
   wherein said lower portion of said front wall portion includes a downward extending portion integrally formed in a single piece and extended in the downward direction below said bottom wall portion.

18. The vehicle according to claim 17, wherein said downward extending portion is provided with a slit extending from a lower end thereof in up and down directions.

19. The vehicle according to claim 17, wherein at least one of said front wall portion and said rear wall portion is formed separately from said bottom wall portion and the separate portion and said bottom wall portion are connected by an engagement.

20. The vehicle according to claim 19, wherein said engagement is a hole formed in said separate portion and a protrusion formed on said bottom wall portion, said protrusion for engaging within said hole.

21. The vehicle according to claim 17, wherein said front wall portion includes an extended portion extending in a rear direction from an inner side thereof and said bottom wall portion includes an extended portion extending in an upper direction from an inner side thereof, and wherein said extended portion of said front wall portion and said extended portion of said bottom wall portion partially overlap to form a front inner side wall.

22. The vehicle according to claim 21, wherein said rear wall portion includes an extended portion extending in a front direction from an inner side thereof, said extended portion forming a rear inner side wall.

23. The sub fender according to claim 17, wherein said lower portion of said rear wall portion includes an integral, downward extending portion extended in the downward direction below said bottom wall portion.

24. The vehicle according to claim 17, wherein said front wall portion is formed from synthetic resin in a single piece with said downward extending portion.

* * * * *